July 1, 1947.  C. M. HUNT  2,423,319
LOCK JOINT FOR FISHING RODS
Filed May 16, 1945
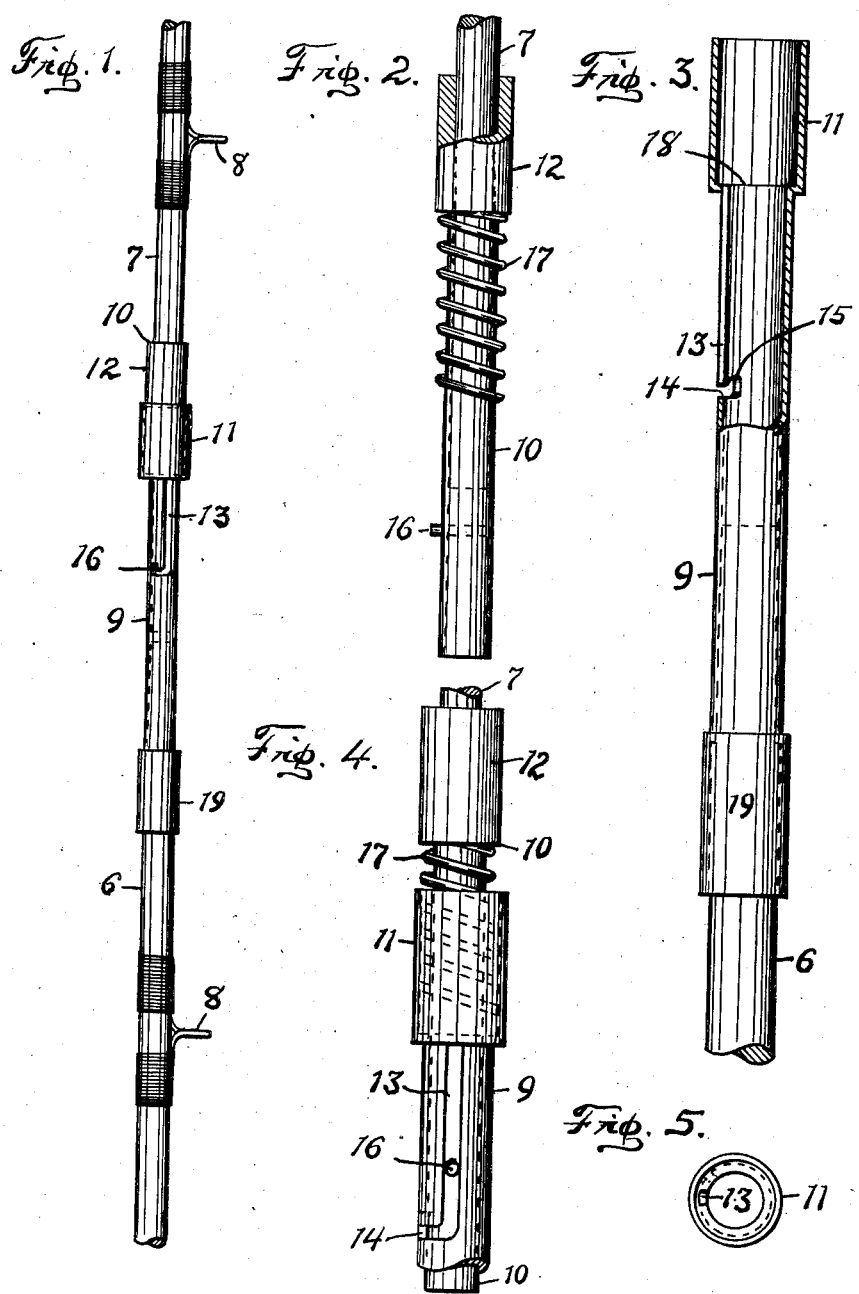
Charles M. Hunt INVENTOR.
BY A. G. Burns
Attorney

Patented July 1, 1947

2,423,319

UNITED STATES PATENT OFFICE 2,423,319

LOCK JOINT FOR FISHING RODS

Charles M. Hunt, Fort Wayne, Ind., assignor of one-half to Joseph E. Quinlan, Monroeville, Ind.

Application May 16, 1945, Serial No. 594,077

4 Claims. (Cl. 287—104)

This invention relates to improvements in lock joints for fishing rods by which the various sections of a fish-rod are secured together and held in axial alinement and secured in definite angular positions relative to the common axis of the rod sections.

Ordinarily, the sections of jointed fish rods are connected together by tight fitting telescopic ferrules that are secured on the ends of the abutting sections. In such instances it is essential that the connecting parts fit snugly to insure stability of the rod after assembly of its sections. Such joints tend to resist force if applied to angularly turn one section relative to the adjacent section with which they are connected, or to disjoint the sections, resulting in inconvenience and liability to become broken or damaged. Jointed rods generally have secured on their several sections line guides that are intended to be axially alined with each other when the sections of the rod are connectedly assembled. Alinement of the guides of the ordinary jointed rod is effected by adjustably turning of the pole sections relative to each other at their jointed connections which necessitates exercise of considerable care and skill each time the rod sections are assembled for use.

An object of the instant invention is to afford a fishing rod having jointed sections so constituted that the sections when connected together are held precisely in the same relative arrangement each time they are assembled, thereby assuring precise alinement of all of the line guides that are secured on the several sections.

Another object of the invention is to afford a lock joint coupling for rod sections that is easy of manipulation while connecting or disassembling the sections, and which is rigid when in operative position.

Other objects and advantages of the invention appear in the following description.

An illustrative embodiment of the invention is shown in the accompanying drawings, in which:

Fig. 1 is a fragmentary elevational view of a jointed fishing rod in which is included the opposing end portions of two rod sections and the lock joint structure in which the invention is incorporated, the joint members being in locked position;

Fig. 2 is a fragmentary elevational view of one of the lock joint members and the end portion of a corresponding rod section, a portion being cut away;

Fig. 3 is a fragmentary elevational view of a companion lock joint member and the end portion of another section secured therein;

Fig. 4 is a fragmentary elevational view of the two lock joint members, one introduced into its companion member preparatory to movement of the members into locking engagement or disengagement; and Fig. 5 is a top plan view of the structure shown in Fig. 3, Figs. 2 to 5 inclusive being drawn to an enlarged scale.

The illustrative embodiment of the invention consists of a fishing rod formed of sections 6—7 arranged in axial alinement with their opposing end portions connected together separably by lock joint couplings, and each section having secured thereon ordinary line guides 8 that project laterally and which are axially alined with each other when the coupling members 9 and 10 are in locked engagement. The members are secured to the corresponding sections on the opposing ends thereof, are tubular so as to encompass the end portions of the sections respectively, and are secured in place thereon by any suitable means, such as in the ordinary practice.

The coupling member 9 has on its upper end an enlargement 11 constituting a receiving chamber, and the member 10 has at its upper end a head 12, the diameter of which is such as to permit entrance of the head into the open end of the chamber and fit snugly therein.

In one side of the tubular coupling member 9 is made a guide slot 13 that extends longitudinally downward from the chamber 11 a suitable distance and has at its lower end a short lateral extension 14 that terminates with an upwardly extending notch 15, and the coupling member 10 has at a point spaced from its lower end a projecting lock-pin 16 that is adapted to be received in the guide slot 13 and moved into locking position in the notch 15 when the shank of the member 10 is inserted through the chamber 11 into the midportion of the coupling member 9.

An open coil compression spring 17 is disposed concentrically on the shank of the coupling member 10 between the head 12 and the lock-pin 16 and has axial play thereon limited by the head and lock-pin. The outer diameter of the coil spring is less than the bore of the chamber 11 into which it is received. During connection of the coupling members the lower end of the spring 17 bears against a shoulder 18, located in the lower end of the chamber 11, while its upper end bears against the lower end of the head 12 and becomes compressed more or less as the coupling members are moved into locking engagement. Thus is prevented unintentional disconnection of the coupling members from each other. The reactionary force of the spring tends to stiffen the joint while locked.

The head 12 on the coupling member 10, and an enlargement 19 on the lower end of the other coupling member 9, serve as reinforcements about the corresponding sections 7 and 6 that prevent splitting of the tubular members when subjected to strain which occurs when the rod is in action.

Essentially, the coupling members are secured in definite positions on the respective sections, angularly with respect to the axes thereof so that when the coupling members are joined in locked position, the line guides on the sections are then disposed in axial alinement with each other. By this arrangement is assured such alinement of the line guides each time the rod sections are connected by the couplings and thus is obviated the necessity of relatively turning the sections adjustably to effect alinement of the line guides.

Variations from the particular construction above disclosed may be resorted to by the exercise of skill in the art, without departure from the spirit or scope of the invention.

What I claim is:

1. In a fishing rod having sections provided with laterally extending line guides and joint couplings separably connecting said sections, said couplings each consisting of tubular members that encompass the opposing end portions of the corresponding sections, one of said members having an enlargement at its upper end constituting a chamber, and in its side wall a guide slot that extends longitudinally downward from the chamber and has a lateral extension at its lower end that terminates with an upwardly extending notch, the other coupling member having an enlargement at its upper end constituting a head, and provided at a point spaced from its lower end with a laterally extending lock-pin adapted to be received in the guide slot and moved into locking position in the notch, and an open coil compression spring concentrically disposed on the shank of said other member between the head and lock-pin thereon and having limited axial play therebetween, the arrangement being such that when said members are in locked connection said line guides are axially alined, said spring is contained wholly within said chamber, and the head of said other coupling member projects into the upper end of said chamber.

2. A joint coupling for fishing rod sections where said sections have laterally extending line guides, said coupling consisting of tubular members that encompass the opposing end portions of the corresponding sections, one of said members having at one end thereof an enlargement constituting a head and, at a point on its shank adjacent the opposite end thereof, a laterally extending lock-pin, and an open coil compression spring concentrically disposed on the shank of said member between said head and lock-pin, the other of said members having an enlargement constituting a chamber, and in its side wall a guide slot that extends longitudinally from said chamber and terminates with a lateral extension provided with an upwardly extending notch adapted to receive said lock-pin when said members are in locked position, said members being secured to the corresponding sections in such positions thereon, angularly with respect to the axes thereof and the location of the line guides on said sections, that when the members of the joint couplings are in locked connection, the spring is held compressed within said chamber and the line guides on said sections are thereby held in alinement with each other.

3. A fishing rod formed of sections each having laterally extending line guides secured thereon, a joint coupling for detachably securing opposing ends of said sections together, said coupling having two members, one of which has a head on one end and a laterally projecting lock-pin located adjacent the opposite end thereof, a compression spring concentrically disposed on said member between the head and lock-pin having limited axial play, the other of said members having an enlargement at one end thereof constituting a chamber, and a slot in which said lock-pin has guided and locking engagement when said members are in operative connection, said members being secured in such positions on the corresponding sections relative to the line guides thereon that when said coupling members are in locked connection the spring is confined in said chamber and said line guides on said sections are thereby held in axial alinement with each other.

4. A joint coupling for fishing rod sections consisting of two coupling members secured respectively on the opposing end portions of said sections, one of said coupling members having an enlargement at one end constituting a head and a laterally projecting lock-pin located adjacent the opposite end thereof, and a compression spring concentrically disposed on said member, the other of said members having an enlargement at one end thereof constituting a chamber and a slot in which said lock-pin has guided and locking engagement, said chamber being adapted to receive said spring when compressed and the lower end of said head when said members are in locked connection with each other.

CHARLES M. HUNT.

REFERENCES CITED

The following references are of record in the file of this patent:

UNITED STATES PATENTS

| Number | Name | Date |
|---|---|---|
| 867,162 | Seidl | Sept. 24, 1907 |
| 1,918,583 | Bear | July 18, 1933 |
| 1,394,177 | Jones | Oct. 18, 1921 |

FOREIGN PATENTS

| Number | Country | Date |
|---|---|---|
| 337,276 | Great Britain | Oct. 30, 1930 |